3,356,581
NUCLEAR REACTOR INSTALLATION
Walter John Cairns, Culcheth, and John Barry Healy, Northwich, England, assignors to United Kingdom Atomic Energy Authority, London, England
Filed Sept. 30, 1965, Ser. No. 491,540
Claims priority, application Great Britain, Oct. 7, 1964, 40,967/64, 40,968/64
11 Claims. (Cl. 176—40)

ABSTRACT OF THE DISCLOSURE

A pressure tube nuclear reactor having a complex of edge abutting flanges embraced by a strap. Second flanges on the pressure tubes overlap the first flanges of adjoining tubes to prevent ejection of a fragment of fractured pressure tube.

---

Figure 1:
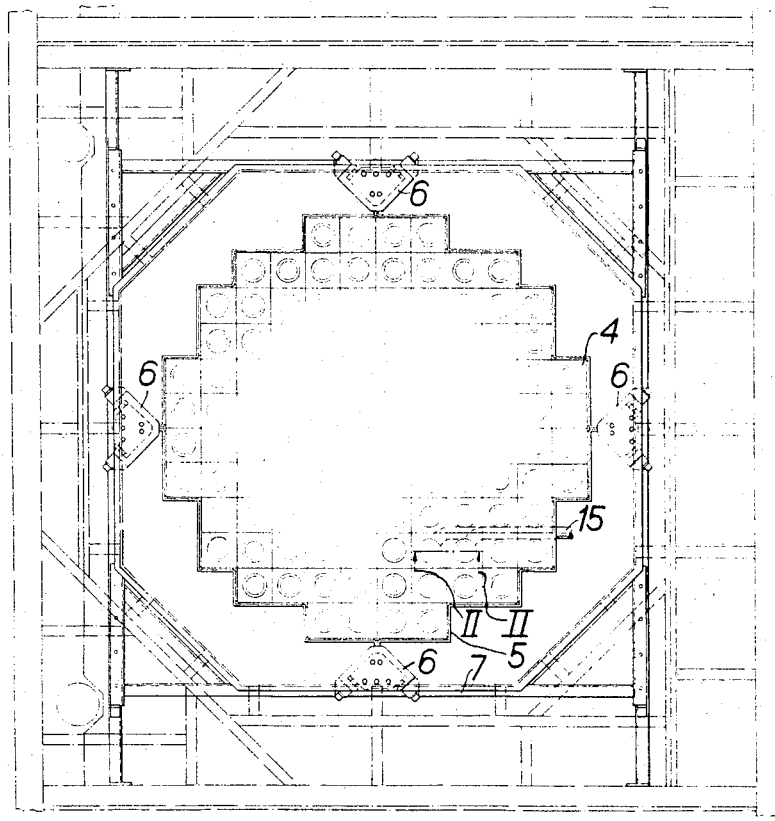

This invention relates to nuclear reactor installations of the kind including a calandria vessel for containing liquid moderator and having tubes for containing nuclear fuel and for conducting pressurised cooling fluid extending through calandria tubes in said vessel.

A "calandria vessel" is a closed vessel having open ended tubes extending therethrough, the open ended tubes being termed "calandria tubes." The tubes for containing nuclear fuel and for conducting pressurised cooling fluid are hereinafter referred to as "pressure tubes."

A typical nuclear reactor installation of the kind described is the 100 mw.(e) steam cooled, heavy water moderated reactor power generating station being constructed at Winfrith Heath, Dorset, England and described in vol. 9 of Nuclear Engineering, February 1964. In this installation the calandria vessel (which contains heavy water serving as a moderator) is enclosed by neutron shield tanks containing light water. The vertically disposed pressure tubes extend through the calandria tubes of the calandria vessel and through upper and lower neutron shield tanks. The pressure tubes (which house nuclear fuel elements and conduct steam coolant at 950 p.s.i.g.) are disposed on a square lattice pitch and are supported by a flange from the upper face of the upper neutron shield tank. An upper portion of the pressure tube upstands from the support flange and this upper portion is referred to hereinafter as a "standpipe."

According to the invention, in a nuclear reactor installation having pressure tubes disposed on a lattice pitch terminating in standpipes, each standpipe has in the region of its free end at least one radially outwardly extending first projection arranged so that the projections co-operate to inhibit deflection of any one standpipe relative to its neighbouring standpipes, the arrangement of co-operating projections as a whole being braced inwardly in a transverse plane at its periphery.

The invention provides that the upper extremities of all the standpipes of the complex of standpipes extending from an upper neutron shield tank are braced against excessive deflection so that the nose of a refueling machine can be indexed into accurate alignment with any selected standpipe.

A nuclear reactor installation according to the invention may have on each standpipe in the region of its free end, at least one radially outwardly extending second projection, the first and second projections arranged so that a first or second projection of each standpipe overlaps a second or first projection of at least one neighbouring standpipe.

In the event of fracture of a standpipe, its ejection from the calandria vessel by reason of the coolant pressure is thereby limited to the extent of the clearance between the overlapping projections of the fractured standpipe and its neighbouring standpipe.

Figure 2:
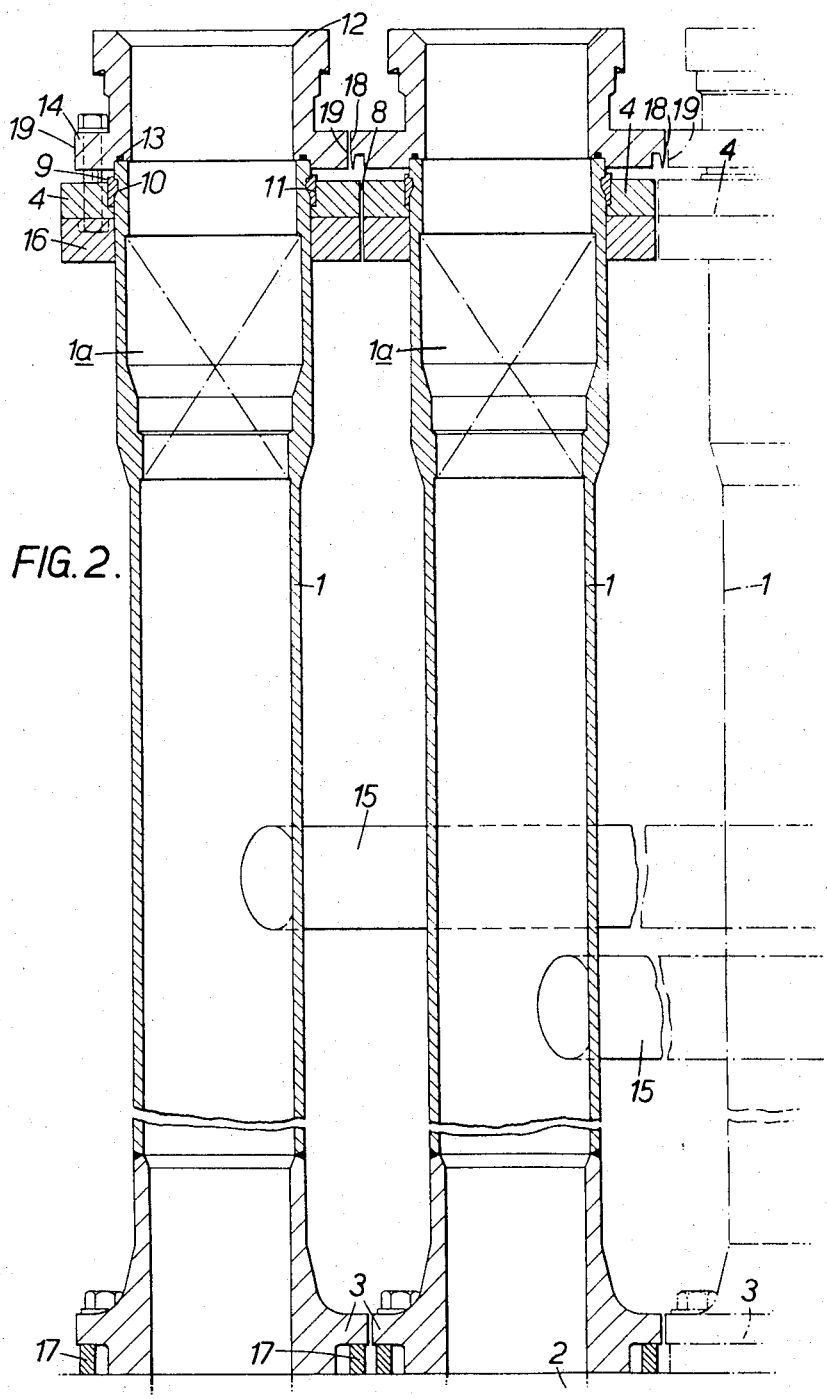
Figure 3:
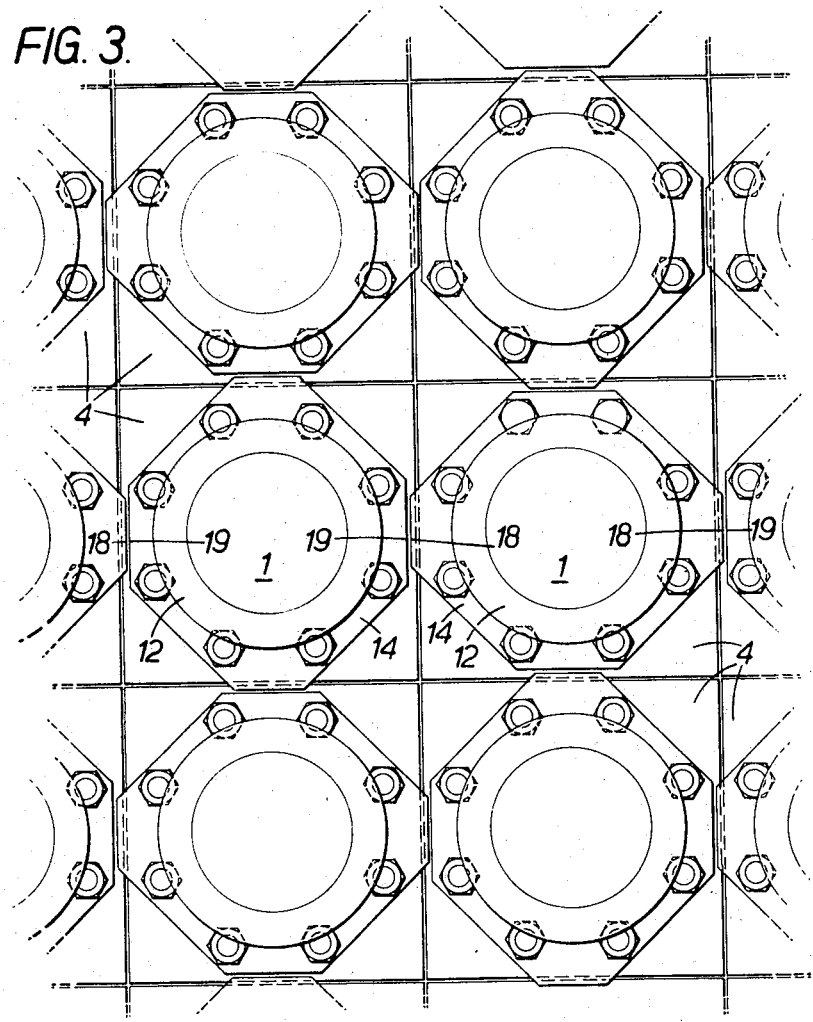
Figure 4:
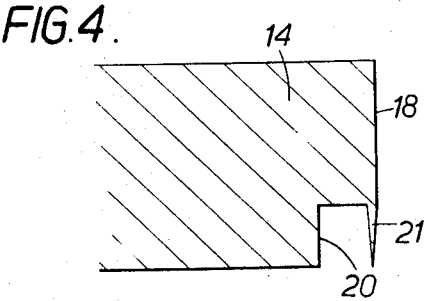

A construction of part of a nuclear reactor installation embodying the invention will now be described, by way of example, with reference to the accompanying drawings wherein:

FIGURE 1 is a plan view of a nuclear reactor core,
FIGURE 2 is a fragmentary side view in section on line II—II of FIGURE 1 and drawn to a larger scale,
FIGURE 3 is a frgamentary plan view of the nuclear reactor core of FIGURE 1 drawn to a larger scale, and
FIGURE 4 is a fragmentary side view showing a detail of FIGURE 2 drawn to a larger scale.

The nuclear reactor core shown in FIGURE 1 includes one hundred and twelve pressure tubes disposed on a square lattice of 10¼ inches pitch. The pressure tube standpipes 1 shown in greater detail in FIGURE 2 are supported from an upper neutron shield tank 2 of the core by a flange 3 and are sealed at their free ends by closure means shown diagrammatically and designated 1a. The standpipes are equipped each with a square flange 4 which constitutes a radially outwardly extending first projection in the regions of their free ends. The square flanges 4 are all disposed in the same transverse plane and the lattice pitch arrangement of square flanges is braced about it periphery by a strap 5 urged radially inwardly by thrust devices 6 mounted on structural steelwork 7 of the construction. The flanges 4 are smaller than 10¼ inches square so that a clearance (designated 8) of approximately .020 inch is provided between adjoining flanges, the clearance 8 being sufficient to allow for adverse tolerances in the constructional dimensions of the installation and thermal expansion of the flanges. As the lattice arrangement of square flanges is braced at its perimeter the deflection of any one standpipe is limited to the extent of the clearance between that standpipe and a neighbouring standpipe.

In greater detail, each flange 4 is mechanically releasable from the standpipe and is longitudinally axially located on the standpipe by an abutment constituted by a split collet 9 which engages an annular groove 10 in the outer wall of the standpipe. The flange 4 is recessed at 11 so that the flange can embrace the split collet to retain it within the groove 10. A refuelling machine nose adaptor 12 abuts the free end of the standpipe being sealed by a pressurised air containing steel torus 13 (commonly known in the trade as a Wills ring) housed within an annular groove. The adaptor 12 has a flange 14 (shown in FIGURE 3) which is bolted to the square flange 4 so that the adaptor 12, flange 4 and split collet 9 co-operate to secure each other in position. Coolant outlet pipes 15 extend from side branches on the sides of the standpipes to outside the core and are laid in stacked arrangement between the rows of standpipes. Two only of the coolant pipes are shown in broken line in FIGURE 1. The flanges 4 support thermally insulating material 16 such as silicon bonded asbestos on their undersides the insulating material of each flange co-operating to retain heat within the void between the square flanges 4 and the upper neutron shield tank 2 in which void the coolant pipes 15 are laid. Thermal insulation 17 between the flanges 3 of the standpipes and the upper neutron shield tank serves to minimise heat exchange therebetween. The flanges 14 which constitute radially outwardly extending second projections are of octagonal shape. The distance between the sides 18 of one pair of opposed sides is greater than the length of side of the square flanges 4 and the distance between the sides 19 of a second pair of opposed sides 90° displaced from the first pair of sides 18 is less than the length of the side of the square flanges 4. Each flange 14 is arranged to overlap the flanges 4 of adjacent standpipes or, where applicable, to overlap a single flange 4 of an adjacent standpipe at the perimeter of the core.

The under face side of the sides 18 of the flanges 14 have a step 20 having a deformable V portion 21 shown in greater detail in FIGURE 4.

In the event of fracture of a standpipe, fluid pressure within the standpipe would cause it to be thrust upwardly until the upper face side of its square flange 4 abutted the V portion 21 of the overlapping flanges 14 of adjacent standpipes which would thereby prevent the standpipe's ejection from the core to cause an even greater hazard than mere fracture. The V portions 21 would then be deformed and thereby absorb the kinetic energy of the fractured standpipe.

The flanges 4 being detachable can be secured to the standpipes 1 after the coolant pipes 15 have been laid between the rows of standpipes. An advantage lies in having detachable refuelling machine nose adaptors 12 in that they can be replaced when worn or damaged or can be substituted for adaptors of a different design.

In the construction described the standpipes extend over a length of 10 feet 8 inches from the upper face of the upper neutron shield tank 2 and have outside diameter within the range 5½ inches to 6½ inches. The flanges 4 are 10.23 inches square and 1¾ inches thick. The step is ½ inch wide and ½" deep and the V portion 21 is .060 inch wide at its root. The distance between the opposed sides 18 of flange 14 is 10¾ inches and the distance between the opposed sides 19 of the flange 14 is 9½ inches.

We claim:
1. A nuclear reactor installation having a nuclear reactor core comprising:
   a calandria vessel,
   pressure tubes extending through calandria tubes in said calandria vessel and terminating in standpipes,
   at least one radially outwardly extending projection on each standpipe in the region of its free end, the projections of the standpipes defining a complex of projections disposed in a transverse plane, and
   means embracing said complex to urge said projections into abutment with one another.
2. A nuclear reactor installation according to claim 1, wherein said projections are flanges attached to the standpipes.
3. A nuclear reactor installation according to claim 2, wherein said flanges are mechanically releasable from the standpipes.
4. A nuclear reactor installation according to claim 3, wherein said standpipes have means defining abutments for locating said flanges on the longitudinal axes of said standpipes, and clamping means for securing said flanges against said abutments.
5. A nuclear reactor installation according to claim 4, wherein said clamping means of each standpipe comprises a removable refuelling machine nose adaptor disposed at the free end of said standpipe.
6. A nuclear reactor installation having a nuclear reactor core comprising:
   a calandria vessel,
   pressure tubes extending through calandria tubes in said calandria vessel and terminating in standpipes,
   at least one radially outwardly extending first projection on each standpipe in the region of its free end, the first projections defining a complex of first projections disposed in a transverse plane,
   means embracing said complex to urge said projections into abutment with one another, and
   at least one radially outwardly extending second projection on each standpipe in the region of its free end, said first and second projections arranged so that a first projection of each standpipe and a second projection of a neighbouring standpipe overlap.
7. A nuclear reactor installation according to claim 6, wherein the first and second projections are first and second flanges.
8. A nuclear reactor installation according to claim 7, wherein the first and second flanges are mechanically releasable from the standpipes.
9. A nuclear reactor installation according to claim 8, the standpipes having abutments and means securing the first and second flanges to the standpipes by clamping them together about said abutments.
10. A nuclear reactor installation according to claim 9, wherein one of the first and second flanges of each standpipe has a deformable portion on the face side adjacent the other of the first and second flanges and disposed so that in the event of fracture and ejection of a neighbouring standpipe, kinetic energy of the ejected standpipe is absorbed by deformation of the deformable portion.
11. A nuclear reactor installation according to claim 10, wherein the deformable portion is on a flange on a removable refuelling machine nose adaptor.

References Cited

UNITED STATES PATENTS

| | | | |
|---|---|---|---|
| 2,851,410 | 9/1958 | Vernon et al. | 176—31 |
| 2,970,097 | 1/1961 | Correc | 176—85 |
| 3,026,256 | 3/1962 | Liljeblad et al. | 176—32 |
| 3,093,565 | 6/1963 | Blockley et al. | 176—59 |
| 3,108,053 | 10/1963 | Vrillon et al. | 176—58 |
| 3,140,792 | 7/1964 | Harris | 176—87 |

OTHER REFERENCES

Michael et al.: German application No. 1,166,389, printed Mar. 26, 1964, (KL 21g 21/20).

L. DEWAYNE RUTLEDGE, *Primary Examiner.*